United States Patent [19]

Etoh

[11] Patent Number: 5,053,979
[45] Date of Patent: Oct. 1, 1991

[54] SYSTEM AND METHOD FOR AUTOMATICALLY CONTROLLING VEHICLE SPEED SO AS TO TRAIL A PRECEDING VEHICLE

[75] Inventor: Yoshiyuki Etoh, Yokosuka, Japan

[73] Assignee: Nissan Motor Company, Limited, Yokohama, Japan

[21] Appl. No.: 807,223

[22] Filed: Dec. 10, 1985

[30] Foreign Application Priority Data

Dec. 19, 1984 [JP] Japan .................................. 59-266276

[51] Int. Cl.$^5$ ........................... B60T 7/16; G06F 15/60
[52] U.S. Cl. ................................. 364/565; 364/424.01;
364/424.05; 364/456; 364/461; 340/903;
340/904; 100/169; 100/170
[58] Field of Search ................ 364/424, 426, 456, 461,
364/460, 424.01, 424.05, 565; 340/901, 902,
903, 904; 180/168, 169, 170, 179; 342/70, 455;
123/349, 350

[56] References Cited

U.S. PATENT DOCUMENTS

| 4,519,469 | 5/1985 | Hayashi et al. ...................... 340/903 |
| 4,621,705 | 11/1986 | Etoh .................................... 364/424 |
| 4,622,636 | 11/1986 | Tachibana ........................... 364/424 |
| 4,628,317 | 12/1986 | Nishikawa et al. ................. 180/169 |

FOREIGN PATENT DOCUMENTS 0231157  12/1984  Japan .................................. 180/179

OTHER PUBLICATIONS

Erwin F. Belohoubek, "Radar Control for Automative Collision Mitigation and Headway Spacing", 5/82, pp. 95-99.

Primary Examiner—Parshotam S. Lall
Assistant Examiner—Ellis B. Ramirez
Attorney, Agent, or Firm—Foley & Lardner

[57] ABSTRACT

A system for automatically controlling vehicle speed calculates the relative speed between the subject vehicle and another preceding vehicle on the basis of the intervehicle distance detected by an intervehicle distance detector. One of a number of relative speed values derived with reference to different sampling periods is selected according to the magnitude of one of the relative speed values so that a highly accurate and fast responsive system for controlling the vehicle speed can be achieved on the basis of the vehicle speed, intervehicle distance, and selected relative speed.

9 Claims, 3 Drawing Sheets

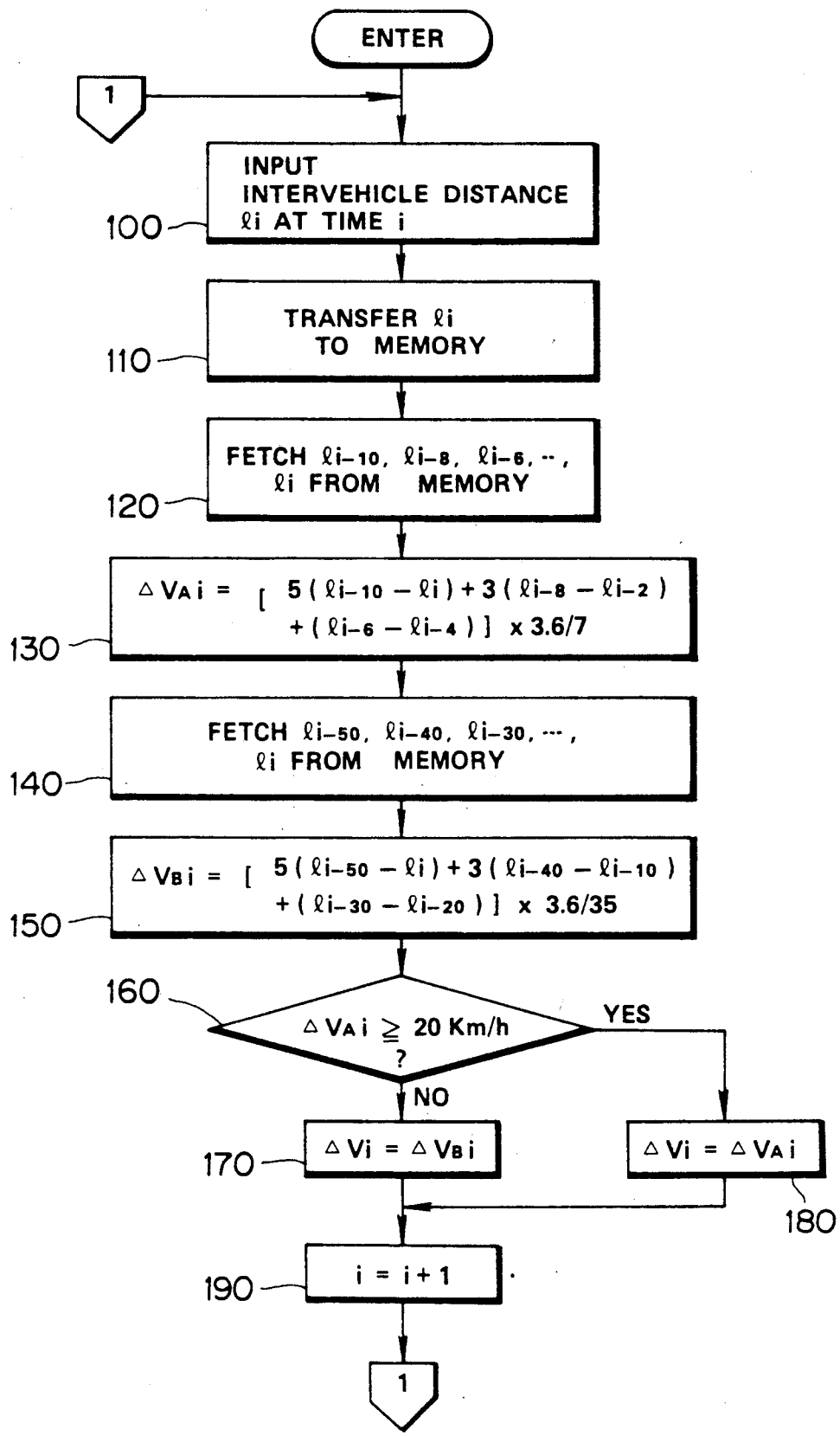

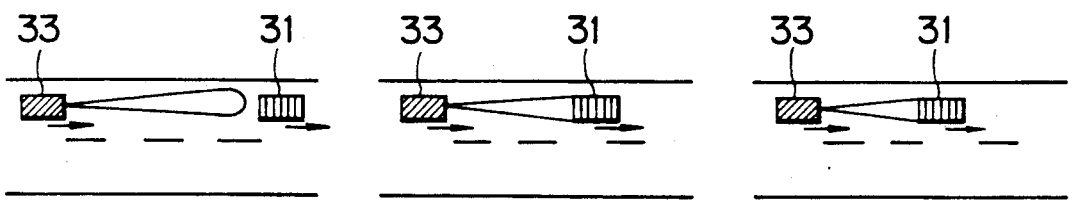
*FIG.4(A)*  *FIG.4(B)*  *FIG.4(C)*
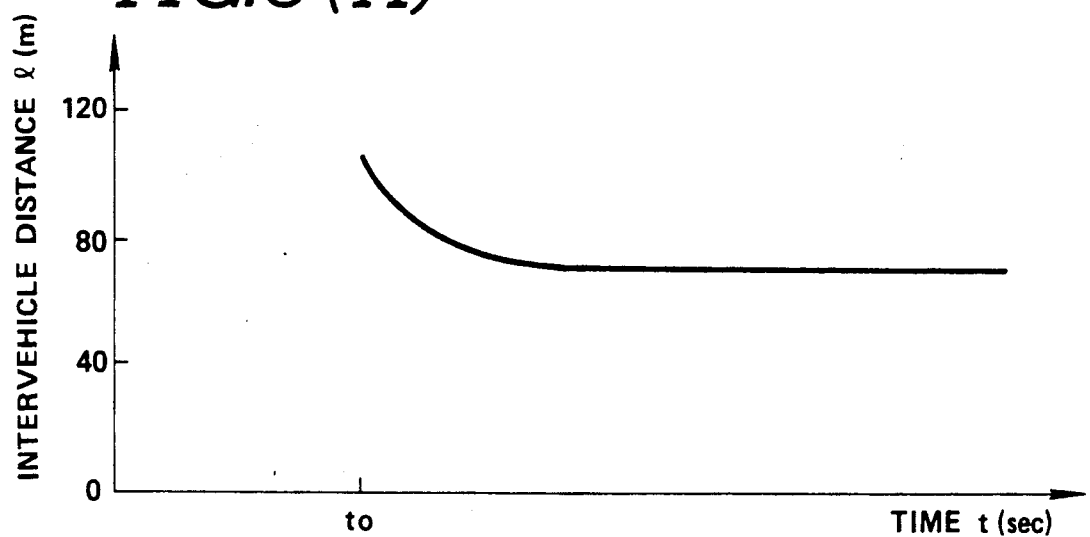
*FIG.5(A)*
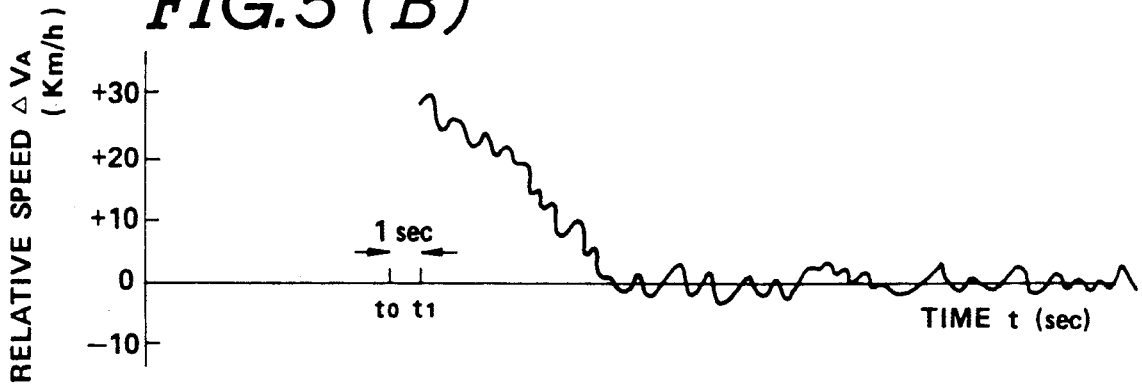
*FIG.5(B)*
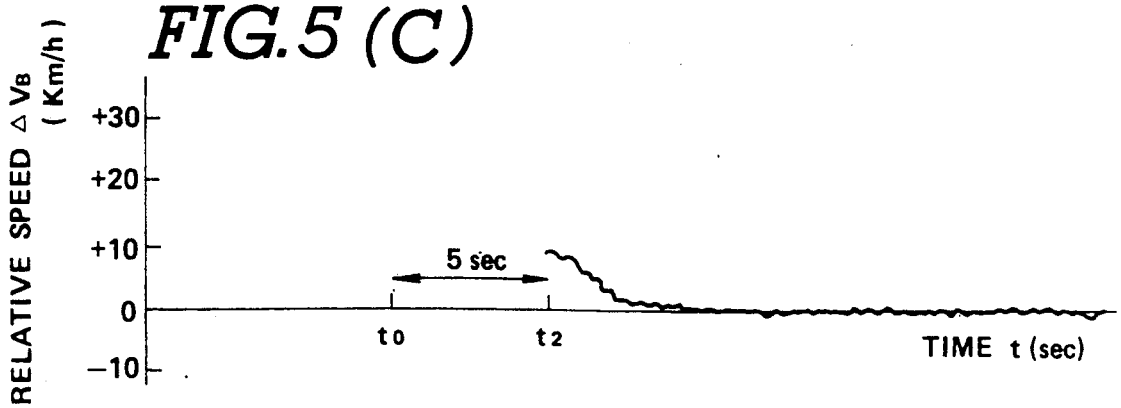
*FIG.5(C)*

SYSTEM AND METHOD FOR AUTOMATICALLY
CONTROLLING VEHICLE SPEED SO AS TO
TRAIL A PRECEDING VEHICLE

BACKGROUND OF THE INVENTION

1. Field of the Invention

The present invention relates to an improved system and method for controlling vehicle speed so as to trail a preceding vehicle while maintaining a safe intervehicle distance between the vehicle and preceding vehicle.

2. Description of the Prior Art

As an adjunct to recently popular "cruise control" systems which automatically hold the vehicle at a constant set speed, various automatic systems have been proposed for trailing preceding vehicles travelling in front of the subject vehicle and in the same direction on the basis of detected intervehicle distance and relative speed. One of the above-mentioned automatic trailing systems is exemplified by Japanese Utility Model Application Unexamined Open No. Sho. 48-99,085 published on Nov. 22, 1973. In the disclosed automatic trailing system, additional means for detecting vehicle speed relative to the preceding vehicle is separate from means for detecting the vehicle speed and means for detecting intervehicle distance. Therefore, the structure of the system is complex and the reliability of the system is reduced. In addition, the increase in the number of system components causes an increase in cost.

To correct for these disadvantages, a conventional system has been proposed in which the relative speed is calculated from the rate of change of intervehicle distance ($\Delta l$) detected by the intervehicle distance detecting means over a unit time ($\Delta t$) so that the above-described means for directly detecting the relative speed is not required.

However, another problem arises in the latter system. Specifically, in the conventional method of calculating the relative speed from the rate of change ($\Delta l$) in the intervehicle distance per unit of time ($\Delta t$), the responsiveness of the system during measurement of relative speed is reduced if a long unit of time is selected and, on the other hand, the accuracy of the measured value of the relative speed is reduced if a short unit of time ($\Delta t$) is selected. Therefore, it is impossible to achieve a system which has both the responsiveness of the conventional system in which a additional relative speed detecting means is used and the high accuracy of the relative speed, although the system is simpler in structure and less expensive.

SUMMARY OF THE INVENTION

With the above-described problem in mind, it is an object of the present invention to provide a more responsive and more accurate system for controlling the vehicle speed in which the vehicle speed relative to the other vehicle in front of the vehicle is derived quickly and with high accuracy without the need for a conventional relative speed detector.

This can be achieved by a system for automatically trailing another moving vehicle, comprises (a) first means for detecting speed of a vehicle in which the system is mounted, (b) second means for detecting intervehicle distance between the vehicle and the other moving vehicle, (c) third means for calculating rates of changes of the intervehicle distance detected by the second means over a plurality of different sampling periods serving as units of time so as to derive relative speed values between the vehicle and other moving vehicle, (d) fourth means for selectively outputting one of the relative speed values derived from the third means according to the derived relative speed, and (e) fifth means for controlling a speed of the vehicle on the basis of the vehicle speed detected by the first means, the intervehicle distance detected by the second means, and the relative speed selectively outputted by the fourth means.

BRIEF DESCRIPTION OF THE DRAWINGS

A more complete understanding of the present invention may be obtained from the following description taken in conjunction with the attached drawings in which like reference numerals designate corresponding elements and in which:

FIG. 3 is a processing flowchart for the relative speed calculation performed by the signal processing unit shown in FIG. 1; and FIGS. 4(A) through 4(C) and 5(A) through 5(C) are diagrams for explaining an example of an encounter between the subject vehicle and another, preceding vehicle in accordance with the embodiment shown in FIG. 1.

DESCRIPTION OF THE PREFERRED EMBODIMENT

Reference will be made to the drawings in order to facilitate understanding of the present invention.

Figure 1:
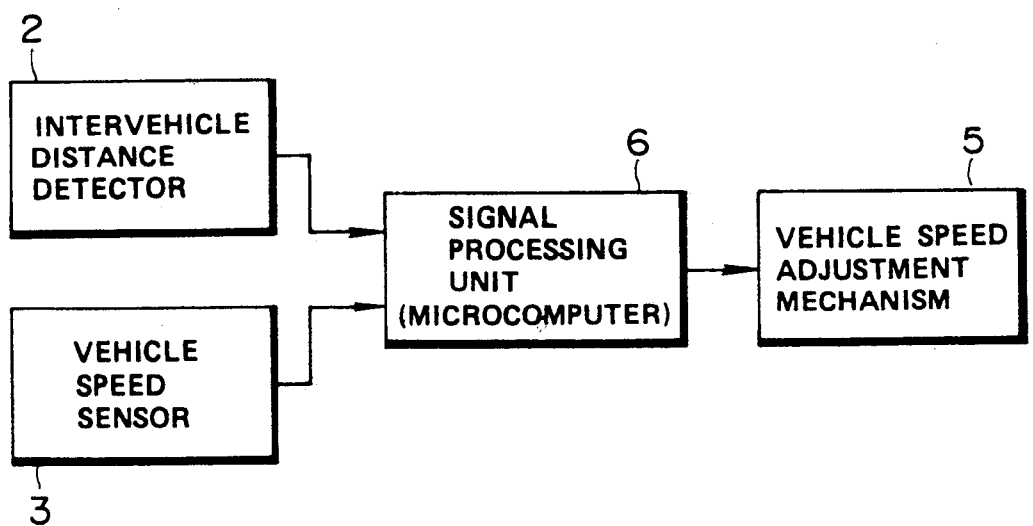
FIG. 1 is a functional block diagram of a preferred embodiment of a system for automatically controlling vehicle speed.

FIG. 1 shows a preferred embodiment of the system according to the present invention.

An intervehicle distance detector 2 and a vehicle speed sensor 3 are connected for output to a signal processing unit 6. The signal processing unit 6 is connected for output to a vehicle speed adjusting mechanism 5 linked with a throttle valve of an engine of the vehicle as described later. The signal processing unit 6 calculates relative vehicle speed from an intervehicle distance signal produced by the intervehicle distance detector 2, produces a relative speed signal according to the calculated result, and outputs an acceleration or deceleration command signal to the vehicle speed adjustment mechanism 5 which then adjusts the vehicle speed.

The signal processing unit 6 comprises, e.g., a microcomputer. The microcomputer comprises: a Central Processing Unit (CPU); a Random Access Memory (RAM); a Read Only Memory (ROM); and Input/Output Unit (I/O).

A process of deriving a relative speed value from the intervehicle distance signal from the intervehicle distance detector 2 will be described below.

In this embodiment, the relative speed value used for vehicle speed adjustment is derived by applying the method of least squares to the six most recent intervehicle distance values sampled by the signal processing unit 6. The signal processing unit 6, i.e. the microprocessor, samples intervehicle distance values either every 0.2 seconds or every second, depending on external conditions, as will be explained later. The intervehicle distance values sampled are actually average values derived by the intervehicle distance detector 2. For example, the intervehicle distance detector 2 may monitor intervehicle distance at a basic sampling rate of 1 msec and then average 100 sampled values so as to output a single intervehicle distance signal every 100 msec.

Figure 2:
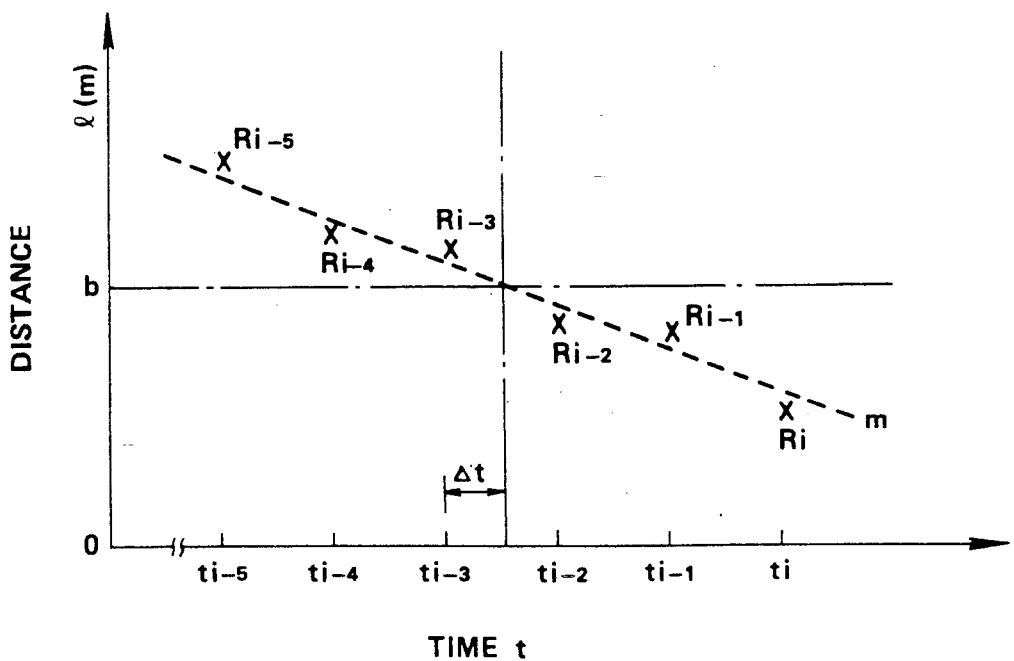
FIG. 2 is a graph of a relative speed calculating time (t) versus apparent inter-vehicle distance (l) in a signal processing unit shown in FIG. 1.

FIG. 2 is a diagram of the sampling and calculation process.

Assume that the sampled distance values are $R_{i-5}$ $(t_{i-5}, l_{i-5})$, $R_{i-4}(t_{i-4})$, ... $R_1(t_i, l_i)$ and let the sampling period $(t_i - t_{i-1})$ be equal to $2\Delta t$. If the coordinate transformation denoted by the dot-and-dash lines of FIG. 2 is carried out, the six points $(R_{i-5}, R_{i-4}, \ldots, R_i)$ will correspond to six points on a straight line m satisfying equation (1) as follows:

$$l' = a\ t', \quad (1)$$

where $t' = t - (t_{i-3} + t_{i-2})/2$ and $l' = l - b$ (b is a constant number) ... (2).

It should be noted that the gradient a of the straight line m is the relative speed value to be derived.

The gradient a is calculated as follows:

A value E derived by adding up the squares of the vertical differences between the straight line m and each of the points $R_n$ can be expressed as follows:

$$E = (l_{i-5} - b - ax5\Delta t)^2 + (l_{i-4} - b - ax3\Delta t)^2 + \quad (3)$$

$$(l_{i-3} - b - ax\Delta t)^2 + (l_{i-2} - b + ax\Delta t)^2 +$$

$$(l_{i-1} - b + ax3\Delta t)^2 + (l_i - b + ax5\Delta t)^2$$

The value E is minimized with respect to the gradient a if $$\frac{\partial E}{\partial a} = 0 \quad (4)$$

Hence, the gradient a can be derived from the above equations (3) and (4).

$$a = \{5(l_{i-5} - l_i) + 3(l_{i-4} - l_{i-1}) + (l_{i-3} - l_{i-2})\}/70\Delta t \quad (5)$$

The relative speeds $\Delta V_{Ai}$, $\Delta V_{Bi}$ can be measured at either of the two sampling periods of 0.2 seconds and 1.0 second by respectively substituting $\Delta t = 0.1$ seconds and $\Delta t = 0.5$ seconds into the equation (5). That is to say, the following two equations (6) and (7) yield the relative speed with corrections for conversion from m/sec. to km/hour and for intervehicle distance sample period.

$$\Delta V_{Ai}[dm/hour] = \{5(l_{i-10} - l_i) + 3(l_{i-8} - l_{i-2}) + (l_{i-6} - l_{i-4})\} \times 3.6/7 \ldots \quad (6)$$

$$\Delta V_{bi}[km/hour] = \{5(l_{i-50} - l_i) + 3(l_{i-40} - l_{i-10}) + (l_{i-30} - l_{i-20})\} \times 3.6/35 \ldots \quad (7),$$

where the $l_n$ values are given in meters.

The action of the preferred embodiment will be described with reference to FIG. 3 which shows a processing flowchart of the signal processing unit 6.

In a first step 100, the microcomputer (constituting the signal processing unit 6) receives the intervehicle distance data $l_i[m]$ at a time i and in the next step 110, the microcomputer stores the input intervehicle distance data $l_i$ memory. In the next step 120, the microcomputer fetches the last six values $(l_{i-10}, l_{i-8}, l_{i-6}, \ldots l_i)$ falling on 0.2 sec intervals from memory and in the next step 130 the microcomputer calculates the relative speed $\Delta V_{Ai}$ in accordance with the equation (6).

In the next step 140, the microcomputer fetches the last six values $(l_{i-50}, l_{i-40}, l_{i-30}, \ldots, l_i)$ falling on 1 sec intervals from the memory thereof and calculates the other relative speed $\Delta V_{Bi}$ in accordance with the equation (7) in the next step 150.

Suppose now that the accuracy of the intervehicle distance detection by the intervehicle distance detector 2 is, for example, ±1 meter. The detection accuracies and response times of the relative speeds $\Delta V_{Ai}$, $\Delta V_{Bi}$ are shown in the following table 1:

TABLE 1

| Method of Calculation | Accuracy [km/h] | Response Time (Second) |
|---|---|---|
| $\Delta V_{Ai}$ | ±7.2 | 1.0 |
| $\Delta V_{Bi}$ | ±1.44 | 5.0 |

As can be appreciated from the table 1, if the sampling period is set to be as short as with $\Delta V_{Ai}$, the detection accuracy is decreased but the response time is improved and if the sampling period is set to be as long as with $\Delta V_{Bi}$, the detection accuracy is enhanced but the response time will be worse.

In a step 160, the microcomputer compares the $\Delta V_{Ai}$ value with a predetermined value $\Delta V_{th}$ (for example, 20 km/h). If $\Delta V_{Ai} \geq V_{th}$ the step 160, the microcomputer recognizes that the positional relationship between the two vehicles is changing rapidly and it gives preference to the shorter response time. Accordingly, in the next step 170, the microcomputer selects the value $\Delta V_{Ai}$ to be used as the relative speed value $\Delta V_i$.

On the other hand, if $\Delta V_{Ai} < \Delta V_{th}$ in the step 160, the microcomputer recognizes that the positional relationship between the two vehicles is changing slowly and accordingly, it selects the value $\Delta V_{Bi}$ to be used as the relative speed value $\Delta V_i$, in step 180 thus giving priority to detection accuracy.

In a final step 190, the time i is incremented by one $(i = i+1)$.

By repeating the above-described processing cycle indefinitely, the relative speed can be derived continuously with optimum accuracy and response time according to conditions.

The signal processing unit 6 executes a vehicle speed control process (not shown) on the basis of the relative speed value thus obtained, of the intervehicle distance detected by the intervehicle distance detector 2, and of the vehicle speed detected by the vehicle speed sensor 3. It then actuates the vehicle speed adjustment mechanism 5 on the basis of the results of the vehicle speed control process. Consequently, the vehicle speed is appropriately controlled according to conditions.

FIGS. 4(A) through 5(C) illustrate how typical intervehicle distance values l, relative speed values $\Delta V_A$, and relative speed values $\Delta V_B$ behave in a typical encounter between the subject vehicle 33 in which the system shown in FIG. 1 is mounted and a preceding vehicle 31, in which the vehicle 33 approaches over a time period expressed as $t < t_o$, decelerates over the next time interval expressed as to $t_o \leq t < t_2$, and finally starts to trail the preceding vehicle 31 in the period $t \geq t_2$.

FIGS. 4(A), 4(B), and 4(C) show the vehicles in the situations described above.

FIGS. 5(A), 5(B), and 5(C) are graphs of the behavior of the intervehicle distance l, the relative speed $\Delta V_A$, and the relative speed $\Delta V_B$ with respect to time t, respectively.

When time $t=t_0$, the unit 6 starts to receive an intervehicle distance signal indicating the presence of the preceding vehicle 31.

When time $t=t_1$, i.e. after 6 of the shorter distance sampling periods, the vehicle 33 starts to decelerate due to derivation of an initial $\Delta V_A$ value (refer to FIG. 5(B)). Thus the vehicle speed of the vehicle 33 approaches that of the preceding vehicle 31. At this time, the response time is more important than the accuracy in the calculation of relative speed.

When time $t=t_2$ i.e. after about five seconds, the first value $\Delta V_B$ (refer to FIG. 5(C)) is calculated. At the same time, since the vehicle speed approaches the speed of the preceding vehicle 31 (refer to FIGS. 5(B) and FIG. 5(C)), the relative speed value $\Delta V_B$, is used to control acceleration or deceleration of the vehicle 33 since the subject vehicle speed has come into close approximation of that of the lead vehicle 31. In this situation, the accuracy of the calculation of the relative speed has precedence over response time.

It should be noted that although the vehicle 33 trails the preceding vehicle 31 at a given intervehicle distance in the situation described above, the calculation of the value of relative speed $\neq V_A$ continues (refer to FIG. 5(A)) so that the value of relative speed $\Delta V_A$ can immediately adapt to vehicle acceleration or deceleration if the speed of the preceding vehicle 31 should changes suddenly, i.e. if $\Delta V_A \geq 20$ km/h in the above-described step 160.

Although in the above-described embodiment, the calculation method for the relative speed value selects between two sampling periods, others method may select from among three or more sampling periods. In addition, the number of samples may excess six.

Furthermore, linear approximation methods other than the method of least squares (e.g., a method of moving average) may be used.

The intervehicle distance detector comprises, e.g., a pair of Radar Units, such as is exemplified by U.S. patent application Ser. No. 756,882 filed on July 19, 1985, U.S. Pat. No. 4,703,429, the contents of which are hereby incorporated by reference.

The vehicle speed control processing is exemplified by U.S. patent application Ser. No. 658,529 filed On Oct. 9, 1984, U.S. Pat. No. 4,621,705, the contents of which are hereby incorporated by reference.

The vehicle speed adjustment mechanism 5 shown in FIG. 1 is exemplified by U.S. patent application Ser. No. 650,704, entitled "A SYSTEM AND METHOD FOR AUTOMATICALLY CONTROLLING VEHICLE SPEED" filed On Sept. 14, 1984, in which the opening angle of the engine throttle valve is controlled so as to adjust the vehicle speed according to a command signal from the microcomputer.

As described hereinabove, in the system for controlling the vehicle speed according to the present invention, the rate of change of intervehicle distance over different units of time is derived, and the relative speed value is selected from among the derived rates of change of intervehicle distance by selecting the relative speed value derived from the shorter sample period when the relative speed is relatively high so as to provide faster response, and by selecting the relative speed value derived from the longer sample period when the relative speed is relatively low so as to provide a more accurate value. This allows a simpler structure since a separate installation of means for detecting the relative speed is not needed. In addition, relative speed can be measured with the same fast response and high measurement accuracy that can be achieved by means of a relative speed detector.

In this way, an appropriate relative speed value can be calculated according to the relationship between the vehicle and preceding vehicle so that a highly reliable system for automatically trailing the preceding vehicle at a safe intervehicle distance on the basis of the relative speed, intervehicle distance, and vehicle speed can be achieved.

It will be fully appreciated to those skilled in the art that the foregoing description is made in terms of the preferred embodiment and various changes and modifications may be made without departing from the scope of the present invention which is to be defined by the appended claims.

What is claimed is:

1. A system for automatically trailing another moving vehicle, comprising:
    (a) first means for detecting speed of a vehicle in which the system is mounted;
    (b) second means for detecting intervehicle distance between the vehicle and the other moving vehicle;
    (c) third means for calculating rates of changes of the intervehicle distance detected by said second means over a plurality of different sampling periods so as to derive respective relative speed values between the vehicle and other moving vehicle;
    (d) fourth means for selectively outputting one of the relative speed values derived from said third means as the relative speed value according to a magnitude of the derived vehicle relative speed value over one of the sampling periods; and
    (e) fifth means for controlling a speed of the vehicle on the basis of the vehicle speed detected by said first means, the intervehicle distance detected by said second means, and the relative speed value selectively output by said fourth means.

2. The system according to claim 1, wherein said third means calculates rates of changes of the intervehicle distance using a method of least squares from values of the intervehicle distance detected by said second means sampled at a first and second sampling periods.

3. The system according to claim 1, wherein said fourth means selectively outputs said one relative speed value depending on whether the magnitude of a first relative speed value exceeds a predetermined value.

4. The system according to claim 3, wherein the predetermined value is 20 km per hour.

5. The system according to claim 3, wherein said plurality of sampling periods comprises a first sampling period which is shorter than said second sampling period.

6. The system according to claim 5, wherein said fourth means outputs said first relative speed value when a first relative speed value outputs said second relative speed value when said first relative speed value does not exceed said predetermined value.

7. A system for automatically trailing another moving vehicle, comprising:
    (a) first means for detecting speed of a vehicle in which the system is mounted;
    (b) second means for detecting intervehicle distance between the vehicle and other moving vehicle;
    (c) third means for calculating first and second relative speed values of the vehicle on the basis of intervehicle distance values derived from second means over respective first and second different units of time, said third means outputting one of said first and second relative speed values on the basis of a function of said first relative speed value; and (d) fourth means for controlling vehicle speed of the vehicle according to the vehicle speed detected by said first means, intervehicle distance detected by said second means, and said one relative speed value calculated by said third means.

8. The system according to claim 7, wherein said third means outputs said one relative speed value on the basis of the magnitude of said first relative speed value being greater than a predetermined value wherein said first unit of time is shorter than said second unit of time.

9. A method for automatically trailing another moving vehicle in front of a vehicle, comprising the steps of:
(a) detecting speed of said vehicle;
(b) detecting intervehicle distance between said vehicle and said other moving vehicle;
(c) calculating first and second rates of changes of the intervehicle distance over a plurality of first and second different sampling periods respectively so as to derive first and second relative speed values respectively between said vehicle and other moving vehicle;
(d) selectively outputting one of the first and second relative speed values depending upon a magnitude of said first relative speed value; and
(f) controlling vehicle speed of the vehicle according to the vehicle speed, intervehicle distance and said one relative speed value.

* * * * *